Patented Nov. 1, 1932

1,886,280

UNITED STATES PATENT OFFICE

FRED M. LOCKE AND FRED J. LOCKE, OF VICTOR, NEW YORK; MERCIE P. LOCKE, ADMINISTRATRIX OF SAID FRED M. AND FRED J. LOCKE, BOTH DECEASED, ASSIGNOR TO CORNING GLASS WORKS, OF CORNING, NEW YORK, A CORPORATION OF NEW YORK

ULTRA VIOLET RAY TRANSMITTING GLASS AND TO A BATCH AND METHOD FOR MAKING THE SAME

No Drawing. Continuation of application Serial No. 101,825, filed April 13, 1926. This application filed January 17, 1927. Serial No. 161,704.

The present invention relates to an ultra violet ray transmitting glass and to a batch and a method for making the same, this application being a continuation of our application No. 101,825, filed April 13, 1926, and an object of this invention is to provide a glass which will transmit large quantities of ultra violet rays in the middle spectral region. Another object of the invention is to provide a glass which, when having a two millimeter thickness, is capable of transmitting at least approximately 50% of ultra violet rays at a wave length of 285 Mu. Another object of the invention is to provide a glass from a batch containing a large amount of boric oxide and an alkaline earth compound, preferably calcium fluoride, or other calcium compound. A further object of the invention is to provide a glass which utilizes carbon for the purpose of increasing the property of the glass for transmitting ultra violet rays. Still another object of the invention is to provide a glass batch in which graphite is used for increasing the properties of the finished glass for transmitting ultra violet rays.

Still another object of the invention is to fire the glass in such a type of container that the glass will not take up from the container materials which will deleteriously affect the ultra violet ray transmission of the glass.

To these and other ends, the invention consists of a glass having certain characteristics and fired under certain conditions and to a batch for producing such glass, all of which will be hereinafter described, and more particularly pointed out in the appended claims.

It is well known that the short rays of light given off by the sun, mercury vapor lamps, electric carbon and iron arcs and some other light sources, and known as ultra violet rays, have therapeutic properties as well as being capable of preventing diseases, such as rickets, tuberculosis or respiratory infections. Furthermore, these rays have remarkable effects on the growth of plants and animals. The approximate wave length limits of the spectral regions of radiant energy from ultra violet radiation is from zero to 400 Mu., this being divided into three regions, known as the extreme region, zero to 200 Mu., the middle region from 200 to 300 Mu., and the near ultra violet region from 300 to 400 Mu.

Most of the common kinds of glass are transparent to the rays from the near ultra violet region to the neighborhood of 350 Mu. and from that point their transparency for such rays falls to zero or less at 300 Mu. The only known glass, which will transmit any ultra violet rays in large quantities below 300 Mu., say 50% ultra violet at a wave length of 290 Mu., or below when 2 mm. thick, is fused quartz. Glass made from fused quartz, however, is extremely hard to melt and to work into shape, and its cost for even relatively small articles is extremely high, rendering its general use impractical. As a result the beneficial results of the ultra violet rays to the inhabitants of cold climates where indoor life is required through many months of the year is not obtainable due to the use of window glass which does not transmit these rays. Moreover, it has been found that the wave lengths between 250 Mu. and 290 Mu. are the ones that do the most healing and are the most effective.

A glass made according to the present invention will transmit a large percentage of the rays in the middle ultra violet region, that is, from 200 to 300 Mu. especially between 260 and 290 Mu. where the healing effect is best, and also in the near ultra violet region, that is from 300 to 400 Mu. and, when very thin, will transmit rays from the extreme ultra violet region. Investigation of the glasses disclosed in our Patent No. 1,529,259 has shown that these glasses can be made to transmit large amounts of ultra violet rays under certain conditions discovered by us, but our investigation has also shown that unless these certain conditions exist these glasses will not transmit any appreciable percent of ultra violet rays.

When the glasses of the aforesaid patent are made from the ordinary materials used in the art and fired in the regular commercial pots or tanks, they will rarely, if at all, transmit any large percentages of the rays. We have found, when the materials used in the batches for these glasses are of the best grade materials and within the ranges given as free as possible from iron compounds or other metallic impurities, and are fired in a graphite pot or receptacle and preferably a high mullite or sillimanite type graphite pot (such pots or crucibles are well-known and are on the market commercially for the melting of copper, brass and other metals) that the resulting glasses will transmit very large amounts of ultra violet rays. The graphite content of the pot will vary with the glass melted, as it is found that some glasses affect the pot more than others. Furthermore, we have found that the hereinafter given batches and glasses within the preferred limits or ranges given, will in addition to transmitting ultra violet rays most always be colorless, transparent glass. This is against all preconceived ideas as it has been thought that the firing of glass in carbon containers or mixing carbon with a glass would inevitably produce a black or amber colored glass. With the glasses of this invention, however such is not the case. Moreover the attack of these glasses upon the graphite pots appears to be much less than with the ordinary type of pot. This is important as all types of glass attack the pots more or less, but for the ordinary uses of glass this is immaterial. With a glass used for transmitting ultra violet rays, however, a very slight attack upon an ordinary pot used in melting the glass will completely nullify its use for transmitting ultra violet rays. With the graphite type of crucibles, the glass can be melted many times in the same crucible without affecting the ultra violet ray transmission of the glass even through the pot is attacked by the glass. In fact, in some cases, we have found that say up to 5% of graphite or other carbon compound may be added to the batch with good results, but we prefer the use of a graphite or carbon containing crucible for the melting. Whether it is the reducing action of the graphite on the batch that causes the greatly increased transmission, or whether the carbon entering into the glass causes the effect, or whether the graphite type of pot stops the glass from taking any impurities from the pot, we do not know, but we do know that, when the glasses within the ranges herein given are fired in graphite containers, a glass is produced which transmits very large amount of ultra violet rays. Our investigations have disclosed that certain ingredients or compounds, and within certain percentage ranges, are best fitted for producing glasses transmitting large amounts of ultra violet rays, and we believe that we are the first to produce a stable commercial glass, which will when in 2 millimeters or more in thickness transmit large amounts of ultra violet rays in the middle spectral region. Glasses which will produce this result particularly when fired in a graphite container are made from a batch containing a large amount of boric acid or its equivalent and an alkaline earth compound, preferably calcium fluoride or other calcium compounds, say from 5% to 70% boric oxid and from 5% up to 50% calcium fluoride or its equivalent. The batch may also contain substantially large amounts of alumina, but should however be free from or low in alkali content.

The boric acid or other boron compound and calcium fluoride or other alkaline earth compound preferably calcium compounds should be used in as large amounts as possible, as it is the combination of these two ingredients that appears to be the most favorable factors in the transmitting of large amounts of ultra violet rays. However, these ingredients should be kept in such percentages as will cause the production of a clear transparent glass, also one that will be stable enough for the purpose used and also one that is workable and will not attack the pots too much to preclude its use. The silica content of the glass should be kept as low as possible, while, at the same time, maintaining workability in the glass and good stability. In some instances, the silica may be dispensed with entirely.

The best glasses have been produced when the ingredients are kept between the following percentages: silica 0% to not over approximately 43%; alumina between 0% to 30%; boric oxide between 5% to 70%; and calcium oxide and fluorine, either collectively or, if no fluorine is present, calcium oxide alone, between 5% and 50%. It will be understood that other alkali earth compounds may be used with or in place of calcium oxide in some instances.

It must be emphasized, however, that in addition to the above materials and percentages certain precautions should be observed in order to obtain the best results or failure is likely to follow. All materials should be as pure as possible and as free from iron, titanium or other metallic compounds or ingredients, as it is possible to obtain them. Further, the pots used should be as free from these impurities as possible as any appreciable amounts thereof in the glass will cause it to fail to transmit the ultra violet rays to any great extent.

The following are three raw batches which may be employed for producing glass according to this invention:

|  | Batch 1 | Batch 2 | Batch 3 |
| --- | --- | --- | --- |
| Silica | 25 | 30 | 27 |
| Alumina hydrate | 22.5 | 30 | 30 |
| Boric acid | 41 | 22 | 28 |
| Calcium fluoride | 11.5 | 18 | 15 |
|  | 100 | 100 | 100 |

An analysis of a glass from raw batch 1 is substantially as follows:

| | |
|---|---|
| Silica | 35.5 |
| Boric acid | 32.5 |
| Alumina | 21 |
| Calcium oxide | 11 |
| | 100 |

An analysis of a glass from batch 2 will be substantially as follows:

| | |
|---|---|
| Silica | 40 |
| Boric oxide | 16.5 |
| Alumina | 26.5 |
| Calcium oxide | 17 |
| | 100 |

An analysis of a glass from batch 3 will be substantially as follows:

| | |
|---|---|
| Silica | 36.5 |
| Boric oxide | 21.5 |
| Alumina | 27 |
| Calcium oxide | 15 |
| | 100 |

It is understood that when calcium fluoride is used in the batch, the resulting glass may or may not contain fluorine, depending largely upon the condition of firing.

Glass from batch 1, when pressed into sheets of two millimeter thickness, starts to transmit ultra violet rays at a wave length of 233 Mu., at 275 it transmits 50% or more, and at 290 Mu. it transmits 70% or more of the rays. Glass from batch 2 when pressed into sheets of the same thickness starts transmitting ultra violet rays at a wave length of 233 Mu. at 275 it transmits 50% or more and at 295 Mu. transmits 70% or more of the rays. Glass from batch 3 will give approximately the same transmission as No. 2. It will be understood that while the above batches are given as suitable for making this invention particularly when fired in a graphite receptacle, many and various changes may be made in the percentages of such ingredients as given or other ingredients added as for example, if other calcium compounds or other alkaline earths are used in place of or with the calcium fluoride, the large amounts of alumina used can be replaced by the boric acid and the calcium compound used, thus making a glass composed largely of boric oxid and calcium oxid, with a low silica content and with or without alumina. It has also been noted that as the alumina is reduced and the calcium increased, the coefficient of expansion of the glass will be increased.

It will also be noted that most of the batches and glasses given are all of relatively large alumina content and it is believed that one reason why these glasses are of high ultra-violet ray transmission is due in part to this large alumina content, because alumina forms no compounds with ferric iron which is herein set forth as one of the materials which has a very detrimental effect on ultra violet transmission.

By this invention a clear transparent glass has been produced which at a thickness of two millimeters will transmit 50% or more of the ultra violet rays at a wave length of 285 Mu., or lower. It will be understood that the thickness of the glass is important in transmitting these rays, as the thicker the glass, the less transmission and the thinner the glass the more the transmission. Furthermore, the rate of transmission is far more rapid in a high transmission glass than a poorer one, as the thickness of the glass is decreased.

By the term "glass" used in the specification and claims, we do not intend to claim such a material as fused silica, but to a material such as is commonly known as glass and which shall contain two or more ingredients in substantial proportions.

It is usual to give the analytical composition of glass in the percentage of oxides of the various elements therein. Therefore, in certain of the claims where the term "analytically containing" is used, we have specified the presence of oxides of certain elements without intending to limit the claims to the presence of such elements in the condition of free oxides, but merely to indicate the presence of compounds of such elements in quantities which, when determined as oxides, give the precentage called for.

What we claim as our invention and desire to secure by Letters Patent is:

1. A high ultra violet ray transmitting glass formed by firing in a reducing condition a batch which is substantially free from alkalies, and containing the following elements in material percents, silicon, boron, aluminum and calcium.

2. In the process of making glass the steps which consists in providing a batch of suitable pure material, said batch containing alumina in substantial amounts, and melting such batch in a graphite container to form a substantially colorless glass.

3. The process of making ultra violet ray transmitting glass which consists in providing a selected batch of pure materials as regards impurities of iron and titanium, said batch containing silica and having a low alkali content, and melting such batch under a reducing condition in a container which will not materially affect the transmission of the resulting glass.

4. A glass characterized by the fact that it contains a relatively large amount of alumina, is low in impurities of iron and titanium and will after complete solarization transmit in excess of approximately twenty-five per cent ultra violet rays at a wavelength of 302 Mu. when in a thickness of 2 mm.

5. A glass characterized by the fact that it contains between fifteen percent and thirty percent of alumina, is low in impurities of iron and titanium and will after complete solarization when at 2 mm. in thickness transmit in excess of fifty percent ultra violet rays at a wavelength of 302 Mu.

6. A glass of high ultra-violet transmission characterized by low iron and titanium contents and on analysis showing the presence of fluorine.

7. A clear glass of high ultra-violet transmission characterized by low iron titanium contents and alkali contents and on analysis showing the presence of fluorine.

8. A clear glass of high ultra-violet transmission characterized by low iron titanium contents and alkali contents and on analysis showing the presence of fluorine, and a substantial percentage of alumina.

9. The hereinbefore described method of producing a colorless glass having high ultra-violet transmission which comprises melting a fluorine containing batch in the presence of carbon.

10. The hereinbefore described method of producing a colorless glass having high ultra-violet transmission which comprises melting a fluorine containing batch in a carboniferous container.

FRED M. LOCKE.
FRED J. LOCKE.